US007860908B2

(12) United States Patent
Kohl

(10) Patent No.: US 7,860,908 B2
(45) Date of Patent: Dec. 28, 2010

(54) COMPUTER METHOD FOR HANDLING PRIVATE PROCESS STATE IN A STACKING FILE SYSTEM

(75) Inventor: John T. Kohl, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/254,987

(22) Filed: Oct. 20, 2005

(65) Prior Publication Data

US 2007/0100855 A1 May 3, 2007

(51) Int. Cl.
G06F 12/00 (2006.01)
G06F 17/30 (2006.01)

(52) U.S. Cl. .................. 707/822; 707/828; 707/831
(58) Field of Classification Search .......... 707/101, 707/100, 200, 822, 828, 831
See application file for complete search history.

(56) References Cited

U.S. PATENT DOCUMENTS

| | | | |
|---|---|---|---|
| 5,093,779 A | 3/1992 | Sakurai | |
| 5,561,799 A | 10/1996 | Khalidi et al. | |
| 5,870,734 A | 2/1999 | Kao | |
| 6,256,031 B1 * | 7/2001 | Meijer et al. ................ 715/854 |
| 6,697,795 B2 | 2/2004 | Holcomb | |
| 6,775,679 B2 | 8/2004 | Gupta | |
| 7,315,860 B1 * | 1/2008 | Harvey ........................ 707/10 |
| 7,610,329 B2 * | 10/2009 | Bone et al. .................. 709/201 |
| 2005/0273858 A1 * | 12/2005 | Zadok et al. ................. 726/24 |
| 2005/0278383 A1 * | 12/2005 | Kazar et al. ................. 707/200 |

OTHER PUBLICATIONS

Radia, Sanjay; "The Per-Process View of Naming and Remote Execution", Aug. 1993, IEEE Computer Society Press.*
Khalidi, Y.A. and M.N. Nelson, "Extensible File Systems in Spring," whitepaper, Sun Microsystems Laboratories, Inc., SMLI TR-03-18, Sep. 1993, pp. 1-18.
Klotzbücher, M., "Diploma Thesis: Development of a Linux Overlay Filesystem for Software Updates in Embedded Systems," Oct. 31, 2004, www.denx.de/PDF/Diplomarbeit-MK-1.0-net.pdf (downloaded Oct. 4, 2005).
Zadok, E. and I. Badulescu, "A Stackable File System Interface for Linux," in *Proceedings of the 5th Annual Linux Expo*, Raleigh, NC, May 1999 (http://citeseer.ist.psu.edu/zadok99stackable.html) 10 pp.

* cited by examiner

*Primary Examiner*—Greta L Robinson
*Assistant Examiner*—Jeffrey Chang
(74) *Attorney, Agent, or Firm*—Hamilton, Brook, Smith & Reynolds, P.C.

(57) ABSTRACT

In a subject filesystem, the invention computer method use the filesystem's dentry trees for all file system objects not contained in a corresponding stacking filesystem. The invention method set the process environment to have a reliable inheritance of the stacking filesystem's root context to new processes and uses the subject filesystem's (VFSMNT, dentry) for most lookups. All lookup results are then with respect to the subject filesystem's roots.

16 Claims, 7 Drawing Sheets

A typical UNIX root filesystem

A typical UNIX root filesystem after mounting a CD

COMPUTER METHOD FOR HANDLING PRIVATE PROCESS STATE IN A STACKING FILE SYSTEM

BACKGROUND OF THE INVENTION

Generally speaking, in the computer arts, a file system is the mechanism that defines the storage, hierarchical organization, access and operations for retrieval and manipulation of data on a storage device or medium (e.g., a hard disk or a CD-ROM). Computer systems using UNIX or Linux operating systems require a file system called the "root filesystem". The root filesystem includes programs and information to start up and manage the subject computer system. The root filesystem is formed of a hierarchical tree of directories 91 and files 89 where the root 93 of this tree is referred to as "root" and denoted by "/". FIG. 1 shows a typical UNIX root filesystem 87.

In UNIX and Linux terminology there are several file types, namely, "regular", "directory", "symbolic link", "block and character oriented device file" and "special". A "regular" file, commonly called "file" is a named container of information stored in a directory. A "directory" file is a container of directory entries, for each file in the subject directory. Each directory entry includes a name and a set of attributes that point to a file (for example its inode, see below). A "symbolic link" is a file containing a pointer to a different file which can be used through the symbolic link. This file type serves to overcome the limitations of hard links which are discussed later. A "Block and character oriented device file" is not a container of sorts but rather an interface to an I/O device that can be accessed directly through the file. "Special" files (pipes and sockets) are files used for interprocess communication and networking.

As mentioned above, directories are files that contain directory entries that point to an inode. As a consequence, one file on a disk may be pointed to by different directory entries. It is said that this file has different hard links. In order to maintain multiple hard links, for each inode there is a link counter. The link counter is decremented each time a hard link is deleted and incremented when a hard link is created. Only when the link counter reaches zero are actual data blocks on disk released.

Hard links are subject to some restrictions. First, users are not allowed to create hard links to directories. Secondly, users are not allowed to create hard links that cross filesystems. This is because in the directory entry the inode number is used as a pointer to the inode, and inode numbers are only unique within one filesystem.

In many cases, access to a certain filesystem located on a device different from the device containing the root filesystem may be required. This separate location may be a different partition on the same hard drive, a CD in a CD-ROM drive or a network filesystem. In order to access the filesystem, the operating system needs to be told to take the filesystem and let it appear under a directory of the root filesystem. That directory serves as the so called mount point 95. This process is called mounting a filesystem. FIG. 2 shows the root filesystem 93 from FIG. 1 after a CD-ROM (separate filesystem 77) has been mounted to the mount point labeled /mnt/cdrom 95. As long as the CD-ROM 77 is mounted, the information stored on it will be available there and accessible through mnt/cdrom.

A "virtual filesystem", also called VFS or Virtual Filesystem Switch is a software layer handling the generic tasks involved in the use of a filesystem. These generic tasks include error checking, caching VFS objects, doing the required locking and communicating with user space. Once the generic tasks are completed, the VFS passes the operation on to the specific layer, where it may be completed or again passed on to a next lower layer. FIG. 3 shows the relation between the generic VFS layer 71 and a specific filesystem layer 73.

To achieve this strict separation, the so called "common file model" was introduced. This object oriented model defines operations and objects which are common to all file systems. The following objects are defined in the common file model:

(1) The superblock object: this object holds all data relevant to a mounted filesystem 77. Disk-based filesystems usually store a copy of this object on disk.

(2) The inode object: this object stores information on a file located within a filesystem, such as size, permissions or access time. Most important, it holds the inode number which is used to uniquely identify a file within a filesystem. Disk-based filesystems usually store a copy of this object.

(3) The file object: this object is used to store information regarding an open file. It holds information on the file and the processes using it. This object exists only in memory.

(4) The dentry object: this object represents a link from a directory entry to an inode. This is necessary because one file can be represented by several hard links. The VFS 71 caches the dentry objects in order to speed up lookup operations.

Each of these objects has a set of operations associated with it which can be defined by a specific filesystem 73. These operations are implemented as a set of function pointers which are used by the VFS 71 to call the appropriate function of the specific filesystem 73. Thus, the separation of generic and specific layers shown in FIG. 3 is achieved where the VFS 71 is able to call the appropriate function of a specific filesystem 73 without having to know any specific detail on how the data is stored in that filesystem 73.

As can be seen from the above, filesystems are mainly implemented in kernel space where debugging is difficult and small bugs may crash a whole computer system. Also filesystems tend to consist of large amounts of code that, due to the nature of operating system kernels, is fairly complex. Therefore, changing and extending existing functionality is difficult.

Stackable or stacking filesystems provide a solution to some of these problems. Instead of modifying an existing filesystem, a new filesystem layer is stacked on top of the existing one. This new layer adds the required functionality in a modular way and therefore can be developed, tested and maintained separately. FIG. 4 shows the relationship between the VFS 71, a stackable filesystem 75 and the lower (specific) filesystem 73.

The VFS layer 71 that handles the generic actions involved in a filesystem 73 operation remains at the top of this hierarchy. When these actions have been completed, the subject function is called for the next lower level. The VFS 71 as a generic layer does not need to know what type of filesystem the lower layer is and will simply call the appropriate function via the VFS-object function pointers. This enables a new layer to be introduced, the new layer being the stackable filesystem layer 75. The stackable filesystem 75 is mounted on top of a mounted filesystem and accessed through the new mount point.

Further, the new stackable filesystem layer 75 has to behave differently from traditional filesystems. As lower layers 73 do not have any knowledge about their caller, the stackable layer 75 needs to present itself in two different manners: to the lower level as the VFS and to the higher as a traditional filesystem. When the VFS 71 calls a function of the stackable layer 75, generic tasks are first performed as done previously by the VFS 71 but for the stackable filesystem 75. Next the stackable file system layer 75 invokes zero or more functions (as object methods) on the layer 73 beneath it. When the call returns to the stackable filesystem layer 75, the result is handled accordingly and then returned to the VFS 71.

Thus, many applications and services employ the use of stacking filesystems because that allows the application or service to intercept filesystem operations and perform their own processing without any modification of the logic of the caller of the filesystem services. However, there are some particular challenges involved in implementing stacking filesystems for Linux systems. Linux kernels do not have a UNIX System V release 4 (SVR4)-style vnode interface. Instead Linux kernels have a different interface spread among several distinct object types and operation vectors. Examples include: inodes (struct inode and inode_operations), directory cache entries (dentries or dcache entries, struct dentry), open-file objects (struct file and file_operations); address space objects (address_space_operations) and super blocks (struct super_block and super_operations). Many operations map straightforwardly between the various Linux kernel operations and either SVR4-style vnode object methods (e.g., VOP_*( ) calls) or file system object methods (e.g., VFS_*( ) calls). The biggest difference that affects stacking filesystems is the way pathnames and lookups are handled.

To create a per-process private state, a stacking file system can establish a per-process root context for file operations. On an SVR4 system this can be done by issuing a hidden chroot to a special vnode in the stacking file system. This special vnode then serves as the starting point for pathnames beginning with "/". VOP_LOOKUP( ) invoked on this vnode may return vnode objects from the original root file system, e.g. looking up "etc" returns the original root file system's vnode representing "/etc". As lookups continue down the name tree and encounter another mounted file system instance from the stacking file system, the context can be found from the process's root directory vnode. The stacking file system then returns results consistent with its design.

A similar technique can be used with a Linux kernel but because of the difference in how pathnames and lookups are handled, various problems are encountered, particularly at the root of the file name space.

The Linux kernel requires file systems to use the directory name cache (dentry) structures instead of vnodes for many of its file operations. Most of the Linux kernel's namespace-related file operations operate on dentries. Many other kernel operations use dentries to hold references to files (most notably the current directory and process root directory). Each separately-mounted file system has a separate dentry tree. Within each mounted file system, these structures are linked in a hierarchical tree structure reflecting the namespace of the file system. The root of the tree is the root of the file system's name space. When a mount-point is encountered, the mounted-over dentry and the mounted-over file system structure (vfsmnt) are used as hash keys to find the new file system's root dentry and file system structure.

If the previous method from SVR4 is adapted to Linux, several of the namespace-modification operations fail in the root directory (e.g., link, unlink, rename). These operations require that the parent directory and object dentries be parent and child in the dentry cache hierarchy. If one uses the same method as above, the dentry for "/" will not be the parent of the dentry for "/etc", because the "/etc" dentry is from the real file system while the dentry for "/" is from the stacking file system.

To address this failure, a Linux-specific method has been tried, but it too fails to work properly. This method shadows dentries for all files in the root file system. In this method, lookups of "etc" in "/" result in a dentry from the stacking file system. The stacking file system must simulate behavior of the real "/etc" object by passing on any requests of this virtual dentry to the real file system's dentry. However, certain requests cannot be passed on correctly, such as mount point crossings: the dentries provided by the stacking file system do not match the real ones, so the hash table lookups for dentries when crossing mount points does not work. The stacking file system thus must shadow all dentries in all mounted file systems. This causes a myriad of other problems, such as incorrect results from disk-space statistics queries (e.g. df -k) and improper behavior for socket files.

SUMMARY OF THE INVENTION

The present invention addresses the problems of the prior art. In particular, the present invention utilizes directory names in the namespace of a subject filesystem without interference from the virtual directory names of the stacking filesystem.

In a preferred embodiment, a computer method and apparatus handle directory names as follows. Given a computer system, there is a subject filesystem and a corresponding stacking filesystem. The present invention method and apparatus obtain directory trees of the subject filesystem. Each directory tree has a root directory entry and plural directory entries linked together in a hierarchical manner. Each directory entry has a respective directory name. For each directory entry, there is a respective filesystem object representing the directory entry. The file system objects in the stacking filesystem have respective virtual directory names. The invention uses the directory trees of the subject filesystem to process operations such that operations are processed using directory names in a name space of the subject filesystem free of interference from the virtual directory name of the stacking filesystem.

Preferably, the present invention further employs one or more alias directory entries. Each alias directory entry has a respective support structure that defines a private state and that provides a pointer to a root directory entry of one of the directory trees of the subject filesystem. Further the invention method/system substitutes a new inode operations vector for an inode operations vector of the root directory entry.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 5:
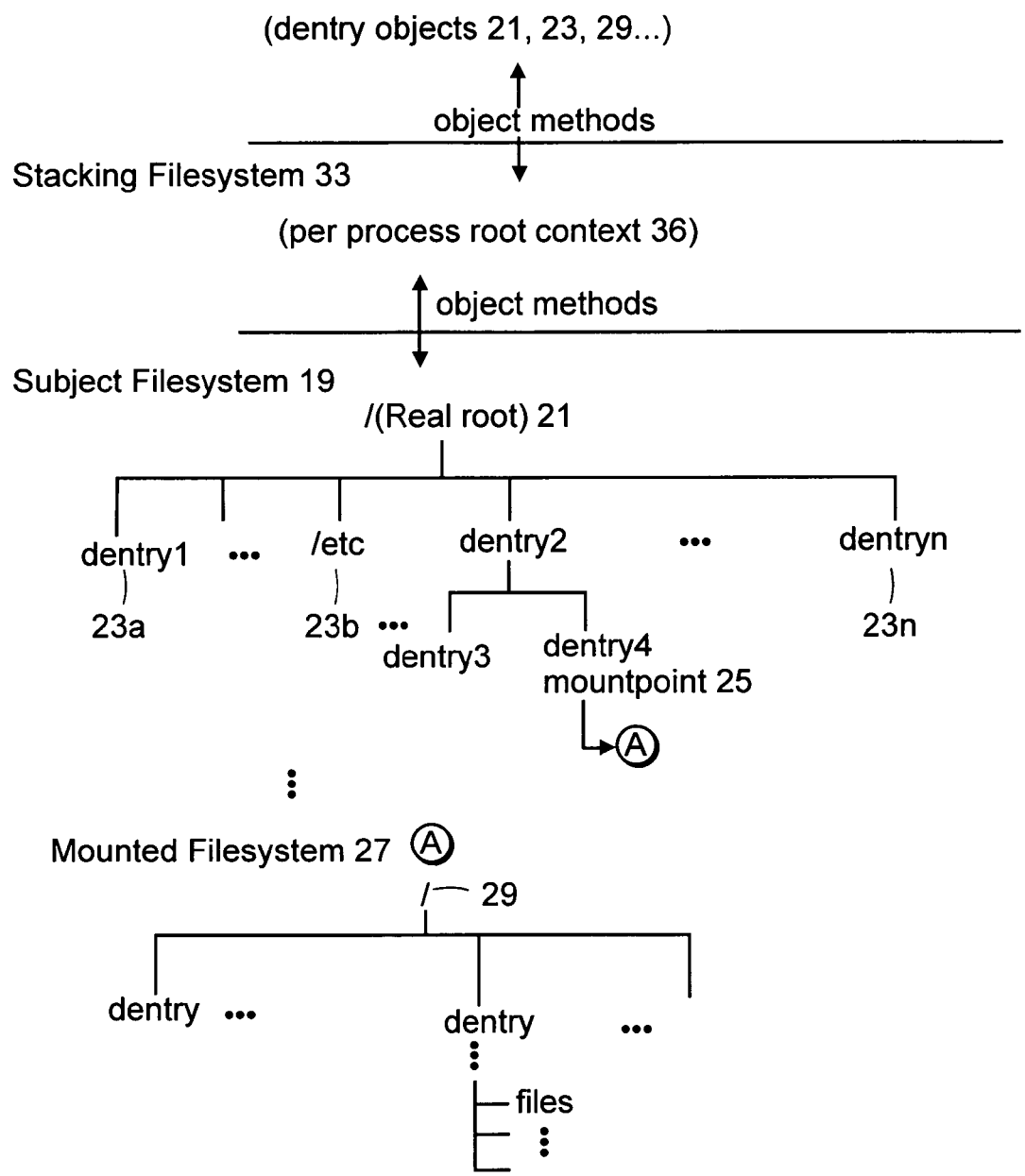
FIG. 5 is a schematic view of one embodiment of the present invention.

Illustrated in FIG. 5 is a subject filesystem 19 such as in the Linux operating system of interest to the present invention. The subject filesystem 19 has root 21 and dentries 23 linked in a hierarchical tree structure. An example dentry is /etc 23b which is further described in FIG. 6 (discussed below) demonstrating principles of the present invention. At 25 is a mount point for a mounted file system 27. Mounted filesystem 27 has a separate dentry tree (illustrated at continuation A) formed of respective dentries, files, root 29 and the like. When mount point 25 is encountered, the root 29 dentry of mounted filesystem 27 is found by matching the mount-over dentry 25 (e.g., "dentry4") and the mount-over file system 19 (e.g., terminal A) in a hash table.

Figure 6:
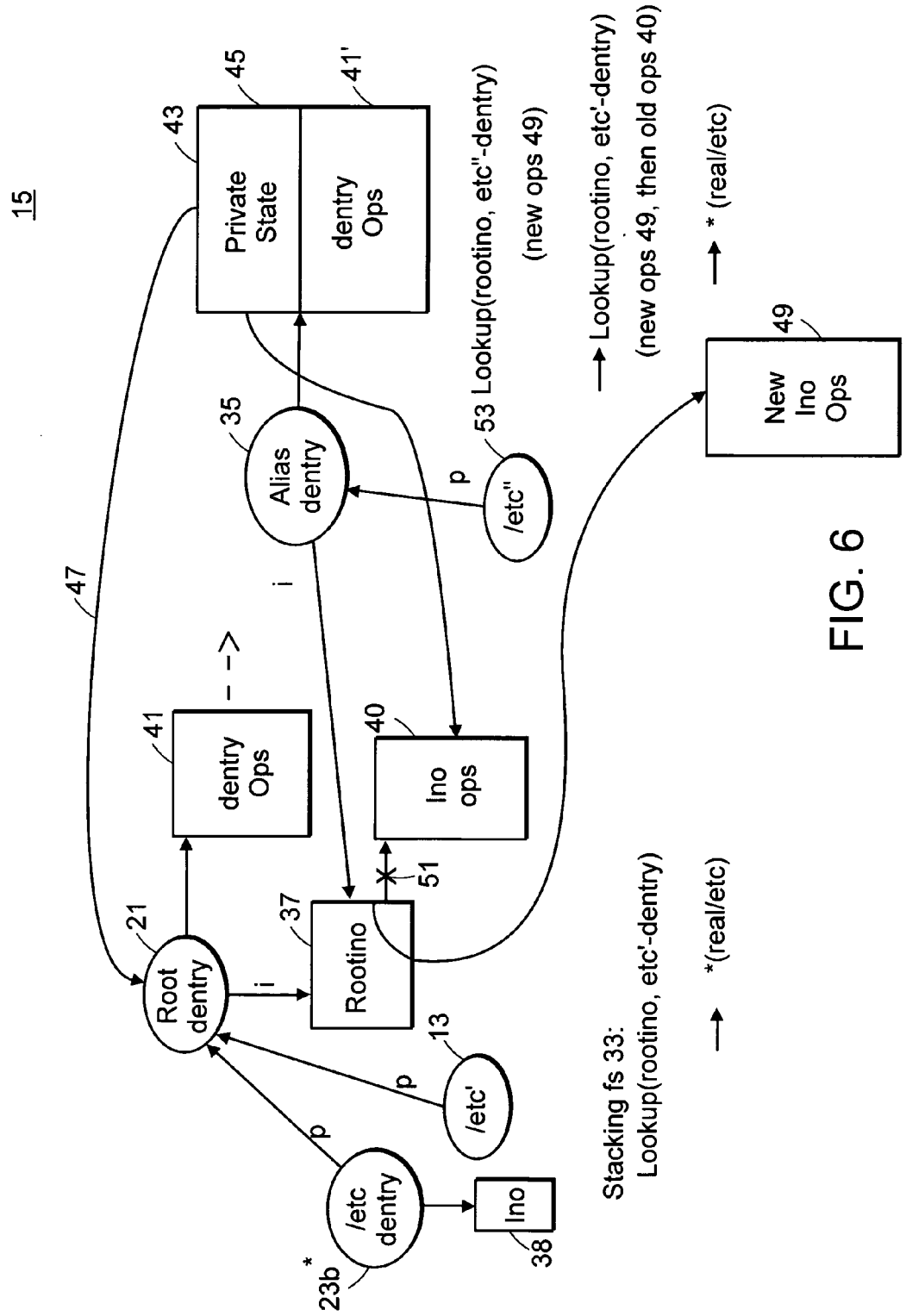
FIG. 6 is a block diagram detailing handling of a dentry of FIG. 5.

Continuing with FIG. 5, given a subject filesystem 19, the present invention uses the system's dentry trees (e.g., from roots 21, 29 and the like) for all filesystem objects not contained in the stacking filesystem 33. This allows the subject filesystem 19 to process file operations on real objects without interference from the stacking filesystem 33, resulting in more reliable and correct filesystem operations. A key consideration with this approach is to set up the process environment to have a reliable inheritance of the stacking filesystem's 33 root context to new processes and use the subject filesystem's 19 (vfsmnt, dentry) for most lookups. This is done by setting the process root to be (/-vfsmnt,alias-dentry)

where /-vfsmnt refers to the subject filesystem 19, and alias-dentry 35 is a special dentry that also points to the real root inode 37 (via the d_inode field) as illustrated in FIG. 6.

To avoid any collision with the real root filesystem 19 using private data pointers in the root dentry 21, the present invention hides the context in the dentry operations vector 41. That is, in the present invention d_ops is made to point to a working structure 43 that contains not only the dentry operations vector 41' but also a private state 45 (current stacking filesystem context 36, a reference to the stacking filesystem's 33 mount point, and a pointer 47 to the real root 21 dentry). This would be sufficient except that any lookups in the VFS 39 dcache would have the parent link set to an alias dentry 35, not the real dentry 21, resulting in an isolated duplicate dentry tree in the stacking filesystem 33. Any mountpoint crossings into the subject filesystems 19, 33, at the same name as dentry 25, would fail to find the target mounts because of the duplicate dentries.

So all the lookup results (dentries) need to be in the real dentry tree (at 19). To do this, the present invention replaces the inode operations vector 40 in the root inode 37 with a respective lookup vector 49, and saves the original vector pointer 51. After substituting the inode operations vector 40, a lookup routine of the present invention is called for all lookups in/(e.g., real root 21), even for processes not using the stacking filesystem 33.

Figure 1:
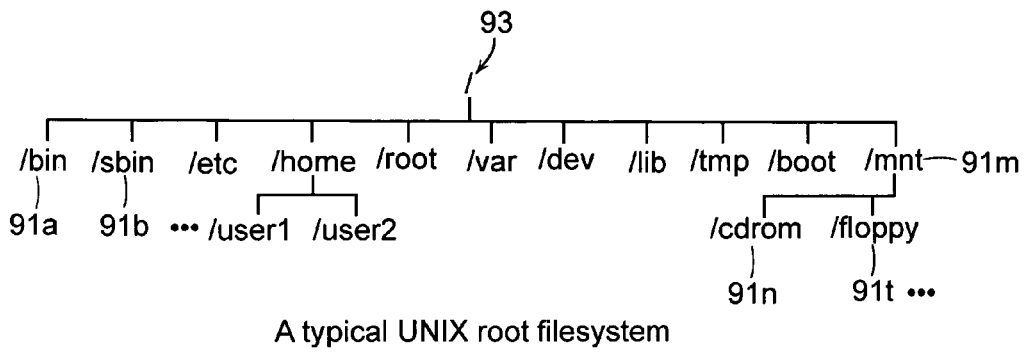
FIG. 1 is a schematic diagram of a typical UNIX root filesystem.
Figure 2:
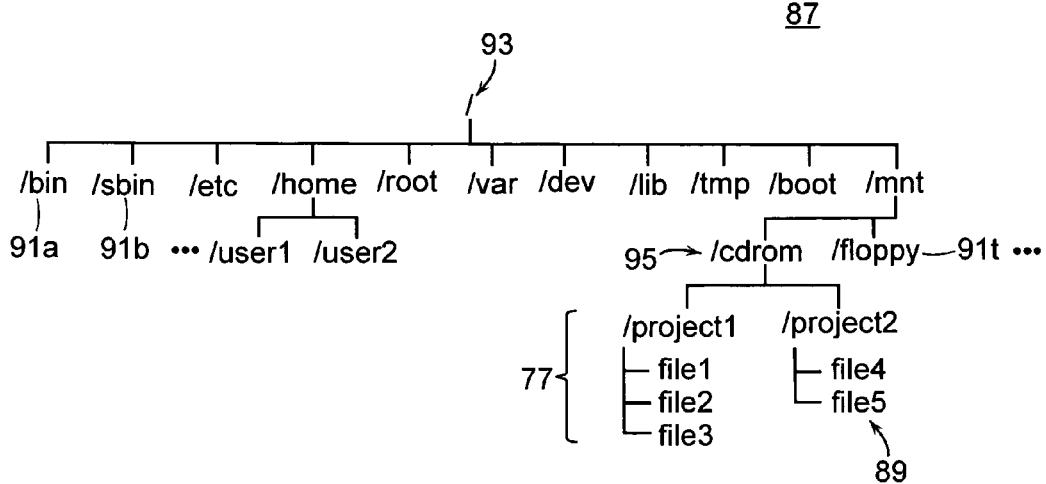
FIG. 2 is a schematic diagram of the root filesystem of FIG. 1 after mounting a CD (the mounted filesystem).
Figure 3:
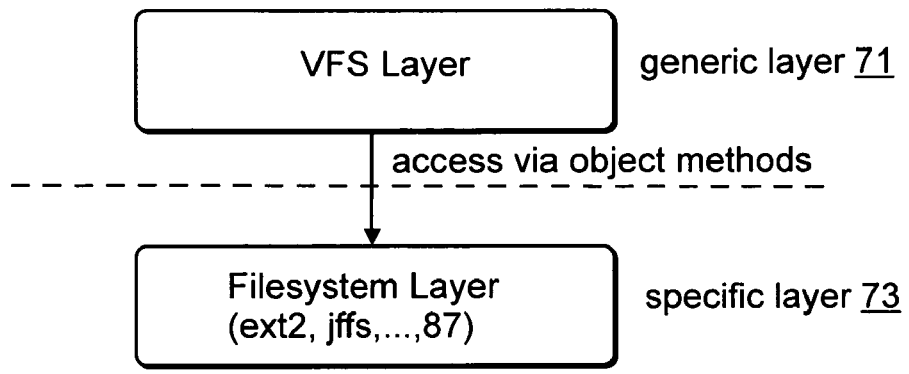
FIG. 3 is a block diagram of a Virtual Filesystem Switch.
Figure 4:
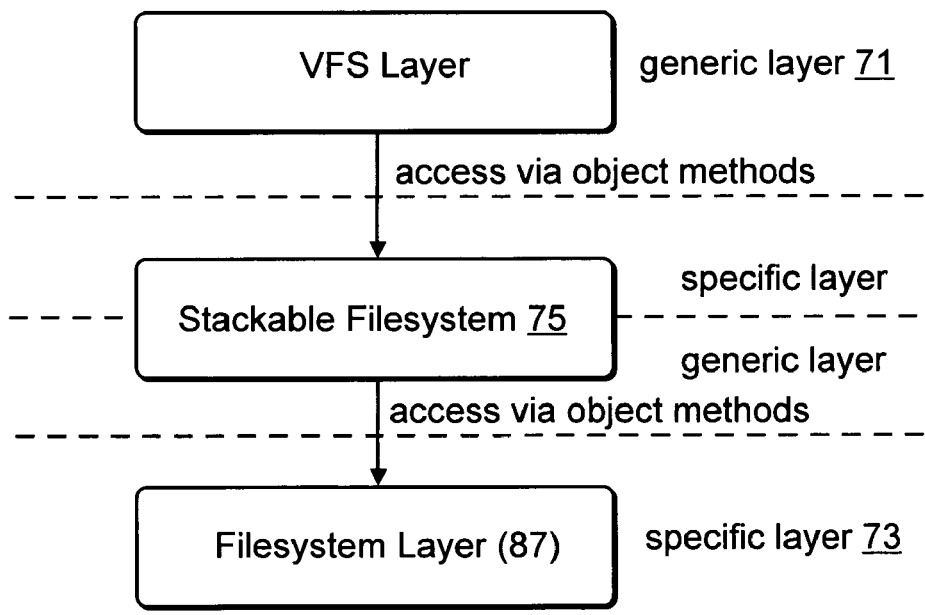
FIG. 4 is a block diagram of a stacking filesystem.

The Linux kernel calls the inode's lookup method as such:

lookup(struct :node *dir, struct dentry *dent)

passing the directory inode and a prospective new dentry 23 with the name filled in. There is no parent dentry passed directly but it can be found from dent->d_parent. The invention routine 15 checks this parent dentry field to see if it is an alias dentry 35. If it is not one of the subject aliases 35, then the routine 15 calls the real lookup method via saved pointer 51 and saved original operations 40, and returns its results (as described in FIG. 4).

If the parent dentry is a subject alias 35, the invention method and apparatus 15 unwraps to the real root dentry 21 (from the alias dentry's extended operation vector 41' in structure 43 and pointer 47), then calls back into the Linux kernel's dcache (via the lookup_hash( ) function) to look up the prospective new dentry 23 name as a child of the original root 21 directory entry. If the cache misses, the root inodes 37 lookup ( ) routine as substituted by the present invention lookup method at 49 is called again, this time passing a new prospective dentry 13 whose parent is the subject file system's dentry 21. In response, the lookup method behaves as above returning the real inode routine's 40 results.

With this scheme, all lookups in the stacking filesystem context 36 use the real dentry trees (at roots 21 and 29) for the root file system 19, and mountpoint 25 crossings into the stacking filesystem 33 work correctly (i.e., mismatch free). Operations in the root directory/21 work normally too, because by the time any syscall has gathered its inputs, the system has them as real inodes 37, 38 and dentries 23 in the regular tree, not linked to the alias dentry 35.

In the example dentry /etc 23b, FIG. 6 shows the corresponding dentry object 23b and associated inode object 38 (holding /etc's unique inode number in filesystem 19) used by the VFS 39 and stacking filesystem 33 methods. In the stacking filesystem 33 name space, /etc' 13 is used and a call to the inode lookup method is Lookup (rootino, etc'—dentry)

The system 15 responds to such a call by determining that real root dentry 21 is the parent dentry of /etc' 13. In turn, the routine 15 calls lookup_hash ( ) to find the result. If the cache misses the name, the system further calls root inode's 37 lookup which invokes inode operations vector 40 and returns the link from directory entry 23b in subject filesystem 19 to the corresponding inode 38.

For filesystem 19 objects not contained in stacking filesystem 33, the present invention uses /etc" 53 and sets the process root to alias dentry 35. A call to the inode lookup method is then Lookup (rootino, etc"—dentry)

The system 15 responds to this call by determining that the parent dentry to /etc" 53 is alias dentry 35. In turn, the present invention follows the respective state and dentry operations structure 41 of alias dentry 35. This results in resolving to root dentry 21 (via pointer 47 from structure 43) and calling the root inodes 37 lookup. The root inode 37 lookup uses the new inode operations 49 which supplant the old inode operations 40. In this root inodes 37 lookup, the system is looking for the name "etc" as a child of the original root 21 directory entry. In particular, a lookup hash function is applied to the operating systems's dcache. If the cache misses, then the root inode 37 calls its lookup routine again but as Lookup (rootino, etc'—dentry)

where dentry 13 is passed as a parameter.

In response, the root inode 37 lookup routine 49 determines the parent of the dentry parameter is the real root dentry 21. Next the routine 15 invokes old inode operations vector 40 and returns the respective /etc dentry 23b (i.e., the link from directory entry 23b to the corresponding inode 38) as described above.

Figure 7:
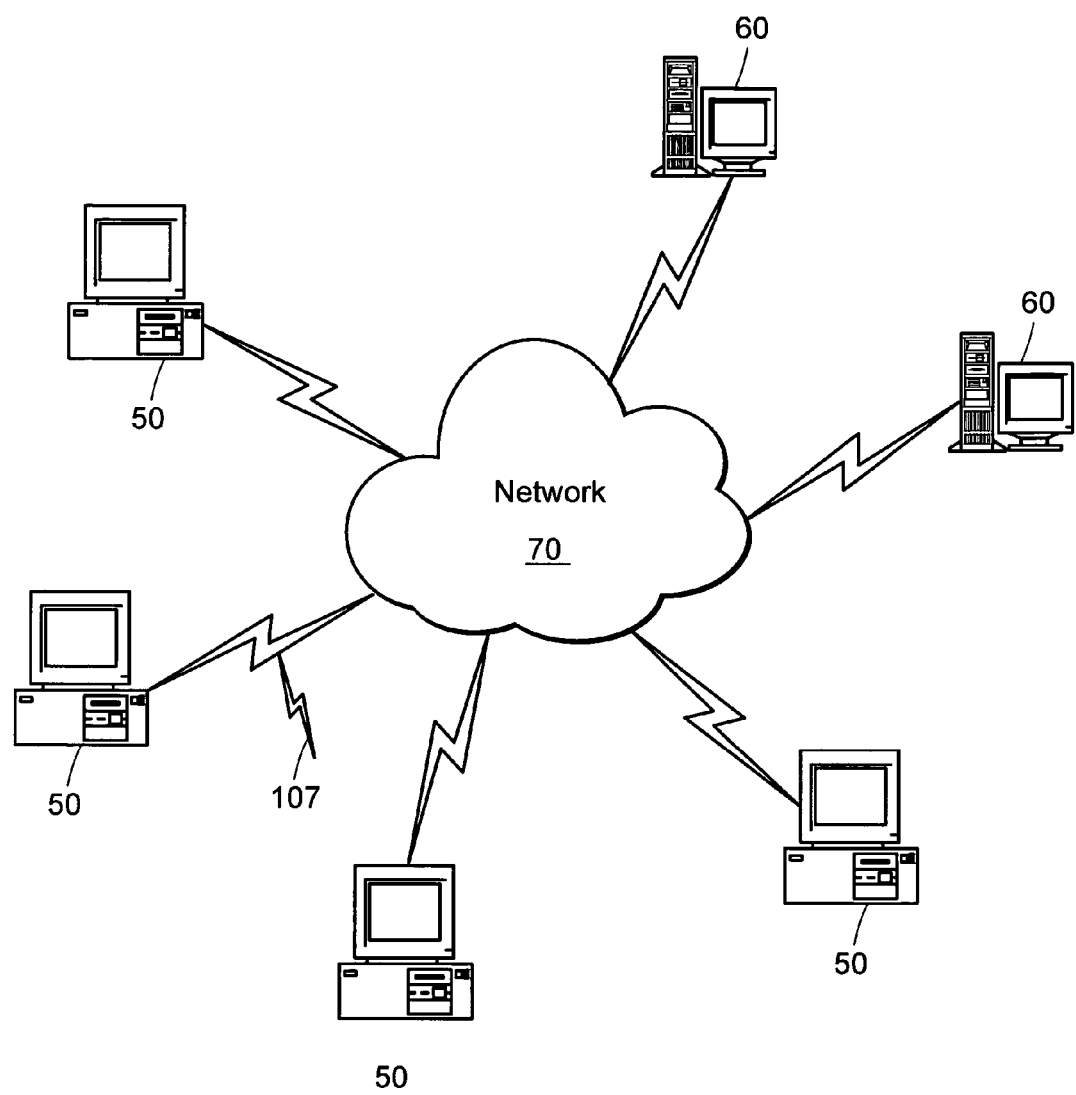
FIG. 7 is a schematic view of a computer network environment in which embodiments of the present invention may be deployed.
Figure 8:
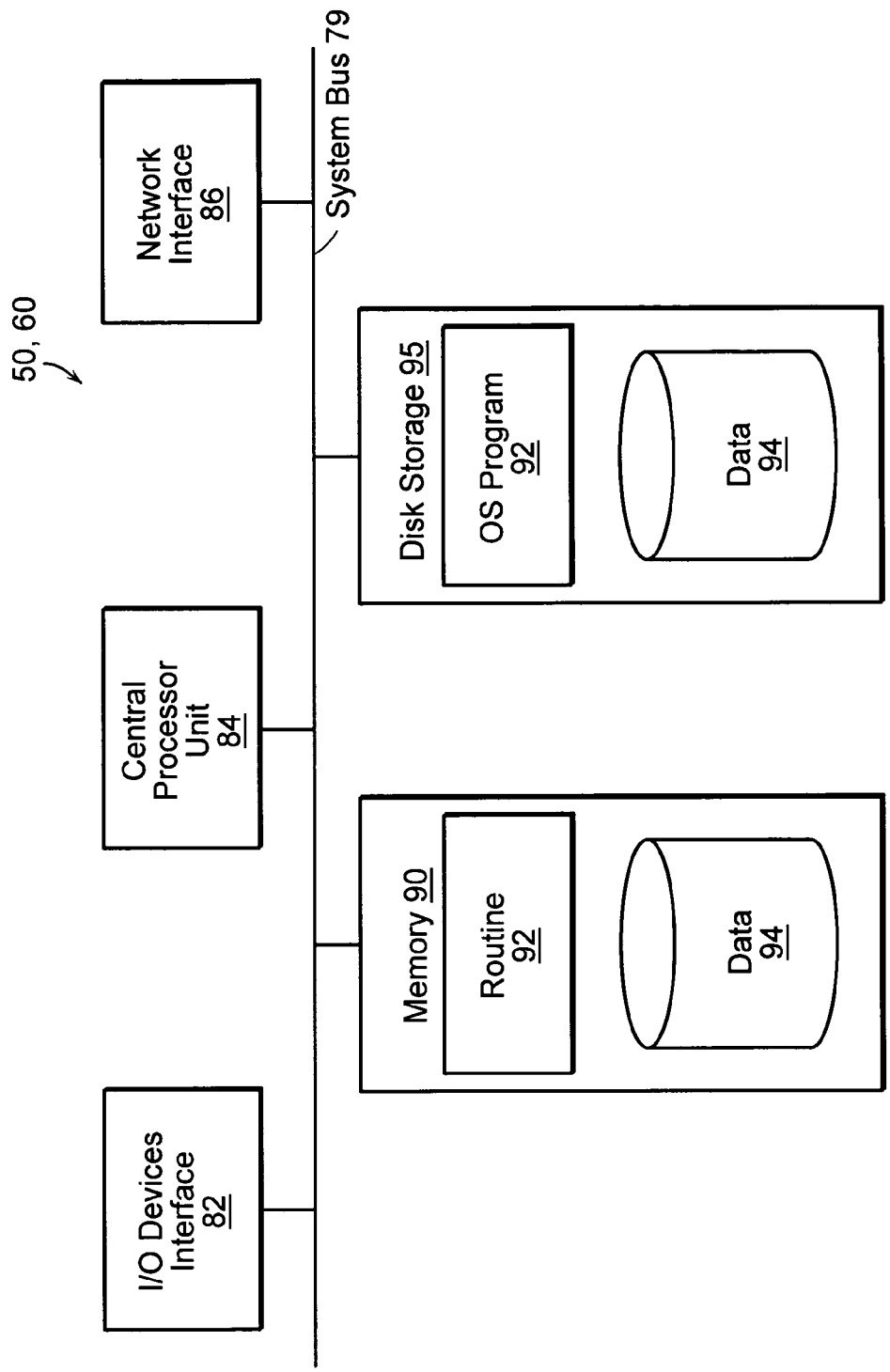
FIG. 8 is a block diagram of one computer node in the FIG. 7 network environment.

Turning now to FIGS. 7 and 8, FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., routine/method 15 described and exemplified in FIGS. 5 and 6 above and further outlined in FIG. 9 below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 9:
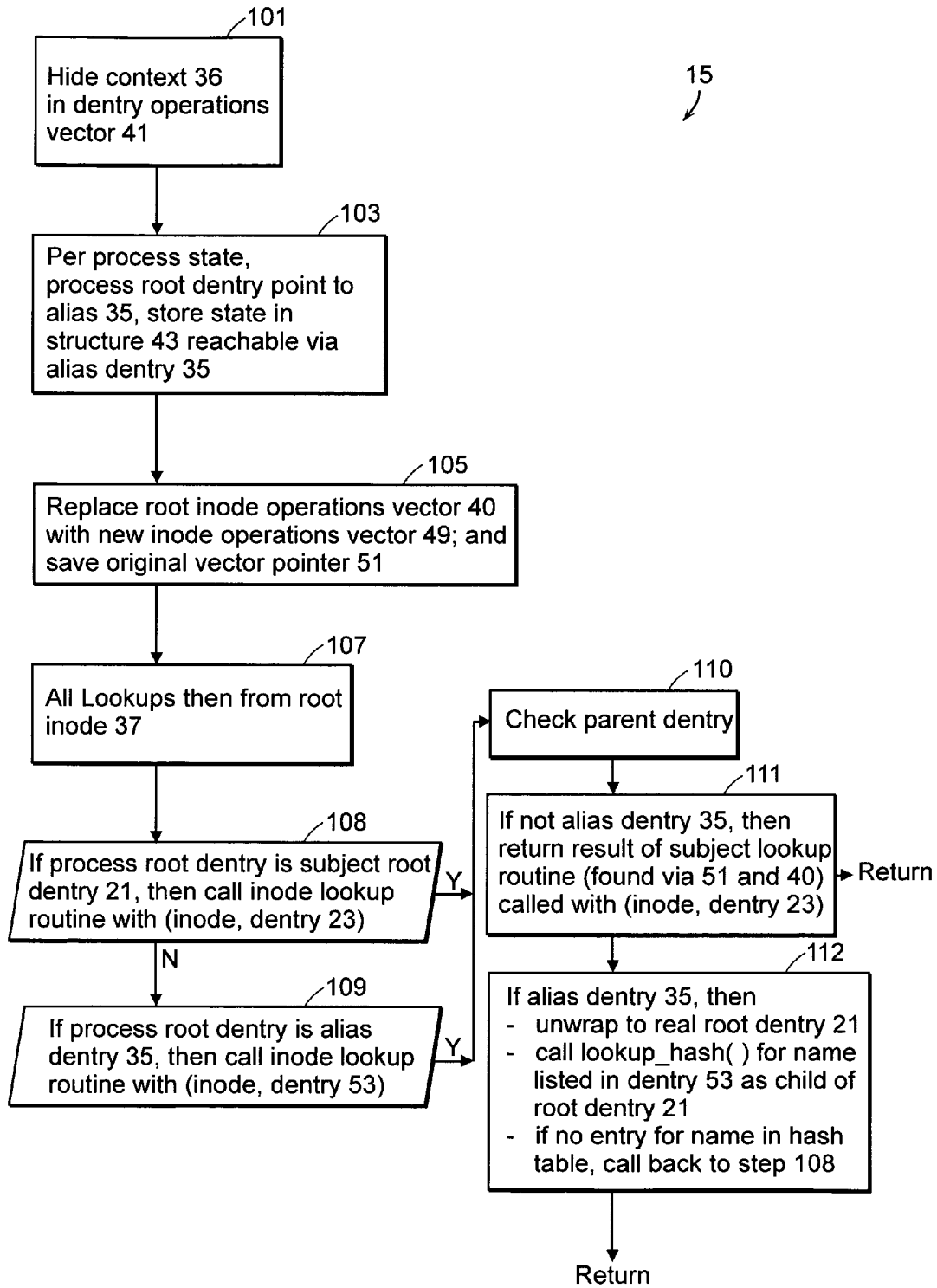
FIG. 9 is a flow diagram of software or method embodiments of the present invention as implemented in FIGS. 7 and 8.

FIG. 9 is a flow diagram that further outlines the present invention process/methods 15. In initial step 101, the present invention 15 hides the process context 36 in private state 45 of combined structure 43. Then on a per process basis, the process state is defined by d-ops which points to a dentry operations vector 41 inside a private structure 43 (step 103) of a respective alias dentry 35.

In step 105, the invention system 15 replaces root inode operations vector 40 with a new inode operations vector 49. Step 105/system 15 also saves the original vector pointer 51.

In step 107, all lookups are from root inode 37. That is, if the process root dentry is subject root dentry 21, then in step 108 the operating system kernel calls the inode's lookup method passing the directory inode and the name of a prospective new dentry 23. If the process root dentry is an alias dentry 35, then in step 109 the operating system kernel calls the inode lookup method with the directory inode and dentry 53.

Following either step 108 or 109, step 110 checks the parent dentry of the passed dentry 23, 53. If the parent dentry is not one of the alias dentries 35, then step 111 calls the subject lookup method (found via pointer 51 and inode operations 40) and returns results (i.e., dentries 23 in the filesystem tree 19).

If the parent dentry is one of the alias dentries 35 of step 103, then step 112 follows the respective structure 43 of the alias dentry 35 to obtain real root dentry 21. Next step 112 calls the lookup_hash function of the operating system kernel's dcache to lookup the name listed in alias dentry 53 as a child of the original root dentry 21. If the cache misses (i.e., finds no entry for the name in the hash table), then step 112 calls back to step 108. This time the real root dentry 21 is passed as a parameter instead of the alias dentry 35. In turn, steps 110 and 111 proceed as described above and return results of the root inode's 37 lookup routine. Thus step 112 ultimately returns lookup results (dentries 23) in terms of real dentry tree at roots 21, 29 of filesystem 19.

As described above, the present invention is a technique to keep using the existing filesystem 19 but enables hanging some additional state information (at 43 for example) necessary for process context. In a preferred embodiment, the present invention makes processes use the original virtual filesystem and original inodes/dentries to get the behavior desired, whereas techniques and methods in the prior art hide the original virtual filesystem and its data structures from processes.

In particular, the present invention deals with in-memory virtual filesystem data structures and per process state.

Further the present invention deals with virtual filesystem data for the root file system of a system image, not data storage volumes.

The present invention does not directly layer multiple filesystem objects, but rather it modifies an existing file system's in-memory structures to provide a mechanism for private per process state while reusing all the same filesystem objects of the original filesystem and sharing them between all processes.

While this invention has been particularly shown and described with references to preferred embodiments thereof, it will be understood by those skilled in the art that various changes in form and details may be made therein without departing from the scope of the invention encompassed by the appended claims.

For example, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. In a computer system having a subject filesystem and corresponding stacking filesystem, a method for handling directory names comprising:
    obtaining directory trees of the subject filesystem, each directory tree having a root directory entry and plural directory entries linked together in a hierarchical manner, each directory entry having a respective directory name, the subject filesystem having a real root directory different then the root directory entry of each directory tree as obtained;
    for each directory entry, representing the directory entry with a respective filesystem object, filesystem objects in the stacking filesystem having respective virtual directory names;
    using the directory trees of the subject filesystem for filesystem objects not contained in the stacking filesystem to process operations such that operations are processed using directory names in a name space of the subject filesystem free of interference from the virtual directory names of the stacking filesystem; and
    wherein the step of using the directory trees of the subject filesystem further includes mismatch free handling of directory names, relative to the virtual directory names of the stacking filesystem, by employing one or more alias directory entries and wherein each alias directory entry has a respective support structure defining a per process root context in which a root directory entry of a process is set to an alias directory entry that resolves to the real root directory entry of the subject filesystem, resulting in a mismatch free handling of directory names.

2. A method as claimed in claim 1 further comprising the step of hiding process context in a directory entry operations vector of the root directory entry, the directory entry operations vector pointing to a respective support structure.

3. A method as claimed in claim 1 wherein the step of using the directory trees further includes substituting a new inode operations vector for an inode operations vector of the root directory entry.

4. A method as claimed in claim 1 further comprising:
    substituting a new inode operations vector for an inode operations vector of a root directory entry of the directory trees of the subject filesystem; and
    calling a lookup routine of the new inode operations vector to process lookup operations, including calling the lookup routine for processes not using the stacking filesystem.

5. A method as claimed in claim 1 wherein the computer system employs a Linux operating system.

6. In a computer system having a subject filesystem and a corresponding stacking filesystem, apparatus for handling directory names comprising:
    one or more directory trees in the subject filesystem, each directory tree having plural directory entries linked together in a hierarchy, each directory entry having a respective directory name, the subject file system having a real root directory different than the root directory entry of each directory tree;
    for each directory entry, a respective filesystem object representing the directory entry, the stacking filesystem using virtual directory names for filesystem objects in the stacking filesystem; and
    a computer implemented routine for processing operations using directory names in a name space of the subject filesystem free of interference with the virtual directory names of the stacking filesystem, such that for filesystem objects not contained in the stacking filesystem the computer implemented routine uses the directory trees of the subject filesystem to process operations including mismatch free handling of directory names, relative to the virtual directory names of the stacking filesystem, by employing one or more alias directory entries and wherein each alias directory entry has a respective support structure defining a per process root context in which a root directory entry of a process is set to an alias directory entry that resolves to the real root directory entry of the subject filesystem, resulting in a mismatch free handling of directory names.

7. Apparatus as claimed in claim 6 wherein each alias directory entry has a respective support structure defining a private state and providing a pointer to a root directory entry of one of the directory trees of the subject file system.

8. Apparatus as claimed in claim 6 wherein the computer implemented routine employs a new inode operations vector that effectively supplants an inode operations vector of a root directory entry of one of the directory trees of the subject filesystem.

9. Apparatus as claimed in claim 6 wherein the computer implemented routine further:
   substitutes a new inode operations vector for an inode operations vector of a root directory entry of the directory trees of the subject filesystem; and
   calls a lookup routine of the new inode operations vector to process lookup operations including calling the lookup routine for processes not using stacking filesystems.

10. Apparatus as claimed in claim 6 wherein the computer system employs a Linux operating system.

11. A computer file system comprising:
   directory tree means providing one or more directory trees of a subject filesystem, each directory tree having a root directory entry and plural directory entries associated in a hierarchical manner, each directory entry having a respective directory name, the subject file system having a real root directory different than the root director entry of each directory tree;
   for each directory entry, filesystem object means representing the directory entry, filesystem object means in a corresponding stacking filesystem employing respective virtual directory names for the directory entries; and
   processor means for processing operations using the directory trees of the subject filesystem for filesystem objects not contained in the stacking filesystem such that the operations are processed using directory names in a name space of the subject filesystem free of interference by the virtual directory names of the stacking filesystem, the processor means having mismatch free handling of directory names relative to at least the virtual directory names of the stacking filesystem by employing one or more alias directory entries and wherein each alias directory entry has a respective support structure defining a per process root context in which a root directory entry of a process is set to an alias directory entry that resolves to the real root directory entry of the subject filesystem, resulting in a mismatch free handling of directory names.

12. A computer file system as claimed in claim 11 further comprising:
   alias directory means for defining a private state; and
   means for substituting a new inode operations means for inode operation means of a root directory entry of the directory tree means, wherein the processor means calls a lookup routine of the new inode operations means to process lookup operations including calling the lookup routine for processing not involving stacking filesystem.

13. A computer file system as claimed in claim 11 wherein the computer file system is utilized in a Linux operating system.

14. A computer program product comprising:
   a computer readable storage medium having a computer readable program, wherein the computer readable program when executed by a processor causes the processor to:
   obtain directory trees of a subject filesystem, each directory tree having a root directory entry and plural directory entries linked together in a hierarchical manner, each directory entry having a respective directory name, the subject file system having a real root directory different than the root directory entry of each directory tree;
   for each directory entry, represent the directory entry with a respective filesystem object, filesystem objects in a stacking filesystem corresponding to the subject filesystem having respective virtual directory names; and
   use the directory trees of the subject filesystem for filesystem objects not contained in the stacking filesystem to process operations such that operations are processed using directory names in a name space of the subject filesystem free of interference by the virtual directory names of the stacking filesystem, wherein use of the directory trees further includes mismatch free handling of directory names relative to at least the virtual directory names of the stacking filesystem by employing one or more alias directory entries and wherein each alias directory entry has a respective support structure defining a per process root context in which a root directory entry of a process is set to an alias directory entry that resolves to the real root directory entry of the subject filesystem, resulting in a mismatch free handling of directory names.

15. A computer program product as claimed in claim 14 wherein the computer readable program is executed in a Linux operating system.

16. A computer program product as claimed in claim 14 wherein the computer readable program further causes the processor to:
   substitute a new inode operations vector for an inode operations vector of a root directory entry of the directory trees of the subject filesystem; and
   call a lookup routine of the new inode operations vector to process lookup operations including calling the lookup routine for processes not using the stacking filesystem.

* * * * *